US009454166B2

(12) United States Patent
Liu

(10) Patent No.: US 9,454,166 B2
(45) Date of Patent: Sep. 27, 2016

(54) LDO REGULATOR WITH IMPROVED LOAD TRANSIENT PERFORMANCE FOR INTERNAL POWER SUPPLY

(71) Applicant: STMicroelectronics (Shenzhen) R&D Co. Ltd, Shenzhen (CN)

(72) Inventor: Yong Feng Liu, Shenzhen (CN)

(73) Assignee: STMicroelectronics (Shenzhen) R&D Co. Ltd, Shenzhen (CN)

( * ) Notice: Subject to any disclaimer, the term of this patent is extended or adjusted under 35 U.S.C. 154(b) by 0 days.

(21) Appl. No.: 14/543,294

(22) Filed: Nov. 17, 2014

(65) Prior Publication Data

US 2015/0185747 A1 Jul. 2, 2015

(30) Foreign Application Priority Data

Jan. 2, 2014 (CN) .......................... 2014 1 0007119

(51) Int. Cl.

| | |
|---|---|
| ***G06F 1/00*** | (2006.01) |
| ***G05F 1/565*** | (2006.01) |
| ***G05F 1/575*** | (2006.01) |
| ***G05F 1/59*** | (2006.01) |
| ***G05F 3/30*** | (2006.01) |

(52) U.S. Cl.

CPC ............... *G05F 1/565* (2013.01); *G05F 1/575* (2013.01); *G05F 1/59* (2013.01); *G05F 3/30* (2013.01)

(58) Field of Classification Search

CPC ................................ G05F 1/575; G05F 3/262
USPC .......................................................... 323/273
See application file for complete search history.

(56) References Cited

U.S. PATENT DOCUMENTS

| | | | | |
|---|---|---|---|---|
| 5,867,015 | A | 2/1999 | Corsi et al. | |
| 6,690,147 | B2 | 2/2004 | Bonto | |
| 8,294,442 | B2 * | 10/2012 | Zhu | G05F 1/575 323/274 |
| 8,344,713 | B2 | 1/2013 | Shrivas et al. | |
| 8,378,652 | B2 | 2/2013 | Xie | |

(Continued)

FOREIGN PATENT DOCUMENTS

| | | | |
|---|---|---|---|
| CN | 204087031 | U | 1/2015 |
| WO | WO-2012084616 | A2 | 6/2012 |

OTHER PUBLICATIONS

First Office Action for CN 201410007119.1 mailed Dec. 14, 2015 (3 pages).

(Continued)

*Primary Examiner* — Adolf Berhane
*Assistant Examiner* — Alex Torres-Rivera
(74) *Attorney, Agent, or Firm* — Gardere Wynne Sewell LLP

(57) ABSTRACT

A voltage regulator includes a feedback regulation loop and a drive transistor configured to source current to a regulated output. A transient recovery circuit is coupled to the voltage regulator circuit and includes a first transistor coupled to source current into a control terminal of the drive transistor, wherein the source current is in addition to current sourced in response to operation of the feedback regulation loop. The first transistor is selectively actuated in response to a drop in voltage at the regulated output. The transient recovery circuit further includes a second transistor coupled to sink current from the regulated output. The sink current has a first non-zero magnitude in the quiescent operating mode of the regulator circuit. In response to an increase in voltage at the regulated output, the operation of the second transistor is modified to increase the sink current to a second, greater, non-zero magnitude.

22 Claims, 5 Drawing Sheets

(56) References Cited

U.S. PATENT DOCUMENTS

| | | | | |
|---|---|---|---|---|
| 2010/0156362 | A1* | 6/2010 | Xle | G05F 1/565 323/273 |
| 2010/0156364 | A1* | 6/2010 | Cho | G05F 1/573 323/280 |
| 2012/0280667 | A1* | 11/2012 | Drebinger | G05F 1/575 323/273 |
| 2013/0119954 | A1* | 5/2013 | Lo | G05F 1/575 323/280 |

OTHER PUBLICATIONS

First Office Action Search Report for CN 201410007119.1 mailed Dec. 14, 2015 (2 pages).

* cited by examiner

LDO REGULATOR WITH IMPROVED LOAD TRANSIENT PERFORMANCE FOR INTERNAL POWER SUPPLY

PRIORITY CLAIM

This application claims priority from Chinese Application for Patent No. 201410007119.1 filed Jan. 2, 2014, the disclosure of which is incorporated by reference.

TECHNICAL FIELD

This invention relates generally to electronic circuits, and more particularly to voltage regulator circuits such as low drop-out voltage regulators.

BACKGROUND

Voltage regulator circuits function to take a varying input supply voltage and generate a stable output voltage. For example, the varying input supply voltage may comprise a battery supplied voltage and the stable output voltage is used to power analog and/or digital circuitry in a battery powered circuit application. The usable operating voltage and current overhead required by the voltage regulator circuit is a critical design consideration. The usable operating voltage is often referred to as the "drop-out" voltage, and this refers to the difference between the varying input supply voltage and the stable output voltage provided by the voltage regulator circuit. The smaller the "drop-out" voltage the better the system operation. Additionally, because the battery can supply only a finite amount of charge, it is important for the voltage regulator circuit to have as small a quiescent current as possible. The combination of a small "drop-out" voltage and small quiescent current ensures a more efficient and longer system operation from limited resource of a battery supply.

In view of the foregoing, there is considerable interest in the art in so-called low drop-out (LDO) voltage regulator circuits. Such regulators advantageously can maintain voltage regulation of the stable output voltage even when the level of the varying input supply approaches that stable output voltage. Maintenance of the stable output voltage is a challenge in the presence of varying load conditions. This is especially true when the load being supplied from the voltage regulator circuit includes digital circuitry. Those skilled in the art recognize that digital circuits are noisy and present a frequently changing load condition. The voltage regulator circuit must respond to those changing load conditions in generating the stable output voltage. However, voltage regulator circuits with low quiescent current characteristics tend to have poor transient response characteristics.

There exists a need in the art for a voltage regulator circuit, in particular of the low drop-out (LDO) type, which exhibits better transient response to varying load conditions.

SUMMARY

In an embodiment, a circuit comprises: a voltage regulator circuit with a feedback regulation loop and a drive transistor configured to supply an output current to a regulated output node; and a transient recovery circuit, comprising: a first transistor configured to source a first current to a control terminal of the drive transistor, wherein said first current is supplied in addition to a regulation control current applied to the control terminal of the drive transistor in response to operation of the feedback regulation loop; a first control circuit configured to selectively actuate the first transistor in response to a drop in voltage at the regulated output node; a second transistor configured to sink a second current from the regulated output node; and a second control circuit configured to control operation of said second transistor to increase a magnitude of the second current, from a first non-zero magnitude to a second, greater, non-zero magnitude, in response to an increase in voltage at the regulated output node.

In an embodiment, a method comprises: operating a drive transistor of a voltage regulator circuit to source current to a regulated output node using a feedback regulation loop; sensing transient voltage change at the regulated output node; and responding to the sensed transient voltage change by: selectively sourcing current into a control terminal of the drive transistor in response to a sensed drop in voltage at the regulated output node, said selectively sourced current being in addition to current sourced to the control terminal in response to operation of the feedback regulation loop; and increasing a magnitude of sinking current, from a first non-zero magnitude to a second, greater, non-zero magnitude, which is sunk from the regulated output node in response to a sensed increase in voltage at the regulated output node.

In an embodiment, a circuit comprises: a voltage regulator circuit with a feedback regulation loop and a drive transistor configured to supply an output current to a regulated output node; and a transient recovery circuit comprising a transistor configured to be selectively actuated in response to a change in voltage at the regulated output node, said selectively actuated transistor configured to apply current to a control terminal of the drive transistor, said applied current being in addition to current applied to the control terminal of the drive transistor in response to operation of the feedback regulation loop.

In an embodiment, a circuit comprises: a voltage regulator circuit with a feedback regulation loop and a drive transistor configured to supply an output current to a regulated output node; and a transient recovery circuit comprising: a transistor coupled to apply current to the regulated output node, said transistor configured to increase a magnitude of the applied current, from a first non-zero magnitude to a second, greater, non-zero magnitude, in response to a change in voltage at the regulated output node.

The foregoing has outlined, rather broadly, features of the present disclosure. Additional features of the disclosure will be described, hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present disclosure and are not necessarily drawn to scale. To more clearly illustrate certain embodiments, a letter indicating variations of the same structure, material, or process step may follow a figure number.

DETAILED DESCRIPTION OF THE DRAWINGS

Figure 1:
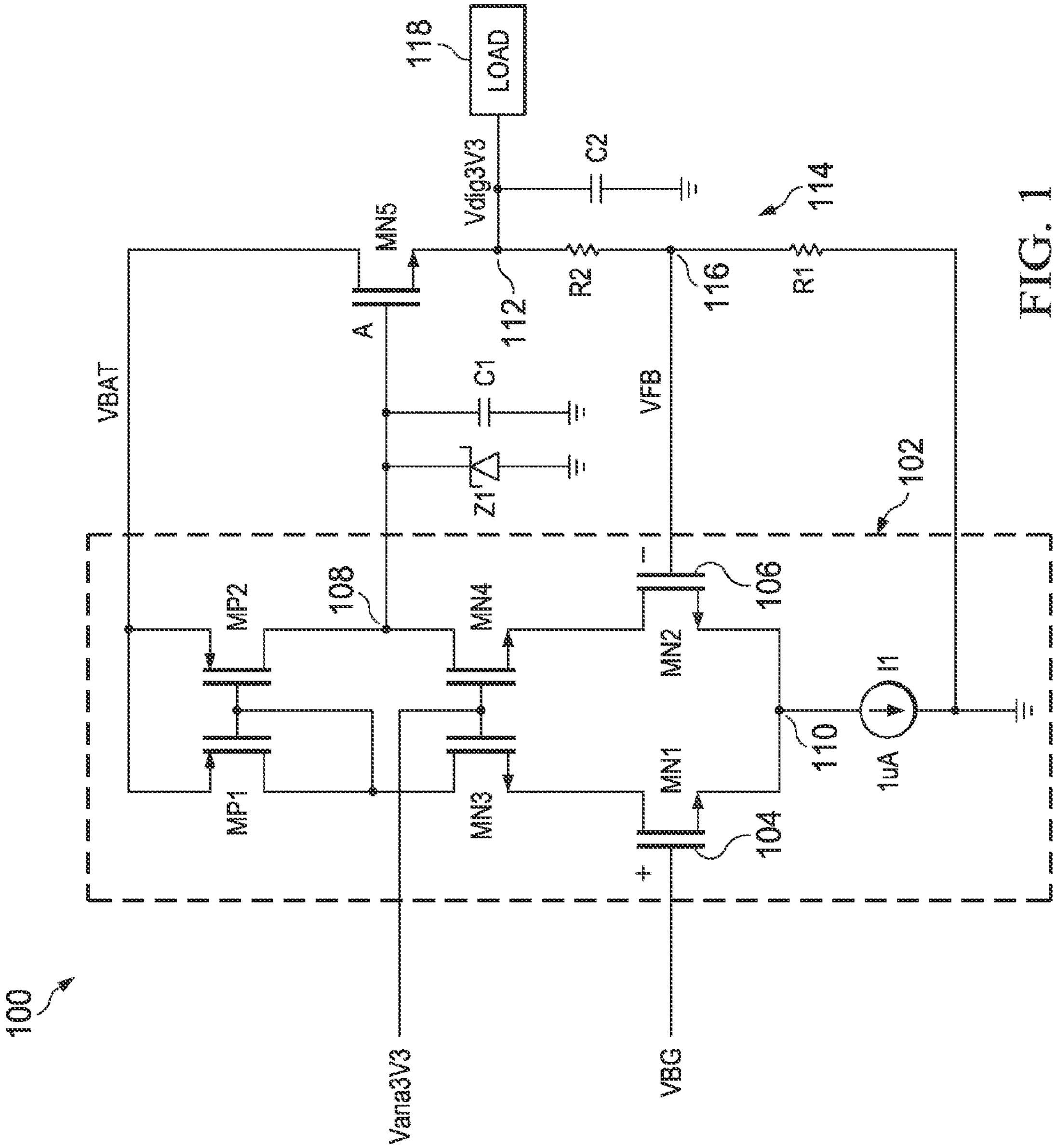
FIG. 1 is a circuit diagram of an embodiment of a low drop-out (LDO) voltage regulator circuit.

Reference is now made to FIG. 1 which illustrates a circuit diagram of an embodiment of a low drop-out (LDO) voltage regulator circuit 100. The circuit 100 includes a differential amplifier 102. The differential amplifier 102 includes a positive input terminal 104 configured to receive a reference voltage (VBG), which in a preferred implementation is generated by a band-gap reference voltage generator (not shown, but whose configuration and operation are well known to those skilled in the art). The differential amplifier 102 further includes a negative input terminal 106 configured to receive a feedback voltage (VFB) generated in a manner to be described herein. The differential amplifier 102 is powered from the positive and negative voltage supply nodes, which is this example comprise the terminals of a battery (not shown) which provides a battery voltage (VBAT) and a ground voltage. Although a battery supply is shown, it will be understood that the voltage supply coupled to the positive and negative voltage supply nodes may comprise any suitable voltage supply for the application. The voltage VBAT may, for example, be a relatively high voltage supply of 6-28 VDC. The differential amplifier 102 further includes an output node 108. In operation, the differential amplifier 102 generates an output voltage at the output node 108 which is substantially equal to the difference between the voltage received at the positive input terminal 104 (in this case VBG) and the voltage received at the negative input terminal 106 (in this case VFB).

The differential amplifier 102 is formed of a pair of differential input transistors MN1 and MN2. The gate of transistor MN1 is coupled to the positive input terminal 104 and the gate of transistor MN2 is coupled to the negative input terminal 106. The transistors MN1 and MN2 are n-channel MOSFET devices. The source terminals of transistors MN1 and MN2 are coupled together at node 110. A fixed current source I1 (referred to in the art as the tail current source) is coupled between the node 110 and the negative voltage supply node (ground). A pair of cascode transistors MN3 and MN4 are coupled, respectively, in series with the pair of differential input transistors MN1 and MN2. Thus, transistors MN3 and MN1 are source-drain coupled in series and transistors MN4 and MN2 are source-drain coupled in series. The transistors MN3 and MN4 are n-channel MOSFET devices, and more preferably are NDMOS-type devices that are configured to withstand high drain-to-source voltages. The gates of the transistors MN3 and MN4 are coupled together to receive a bias voltage (Vana3V3). In a preferred embodiment, the bias voltage (Vana3V3) is a regulated voltage supplied to an analog portion of a device which includes the voltage regulator circuit 100, with the voltage regulator circuit 100 configured to generate a stable output voltage (Vdig3V3) supplied to a digital portion of the device. It will be understood that VanaV3V can be any suitable biasing voltage. The differential amplifier 102 further includes a pair of load transistors MP1 and MP2 coupled, respectively, in series with the pair of cascode transistors MN3 and MN4. Thus, transistors MN3 and MP1 are source-drain coupled in series and transistors MN4 and MP2 are source-drain coupled in series. The transistors MP1 and MP2 are p-channel MOSFET devices, and more preferably are PDMOS-type devices that are configured to withstand high drain-to-source voltages. The gates of the transistors MP1 and MP2 are coupled together and to the drain of transistor MP1. The transistors MP1 and MP2 are accordingly connected in a current mirror arrangement.

The circuit 100 further includes a capacitor C1 coupled between the output node 108 of the differential amplifier 102 and the negative voltage supply node (ground). A zener diode Z1 is coupled in parallel with the capacitor C1. The capacitor C1 functions as a compensation capacitor and the zener diode Z1 functions as a voltage clamp on the voltage stored by the compensation capacitor C1.

The output node 108 of the differential amplifier 102 drives the gate terminal (node A) of a drive transistor MN5. The transistor MN5 is an n-channel MOSFET device (for example, a power MOSFET) having a drain terminal coupled to the positive voltage supply node and a source terminal coupled to an output node 112 of the circuit 100 (which supplies the regulated output voltage (Vdig3V3).

A resistive divider circuit 114 is coupled between the output node 112 and the negative voltage supply node (ground). The resistive divider circuit 114 comprises a first resistor R1 coupled in series with a second resistor R2 at a tap node 116. The feedback voltage VFB is generated at the tap node 116 which is coupled to the negative input terminal 106 of the differential amplifier 102.

A capacitor C2 is coupled between the output node 112 and the negative voltage supply node (ground). The capacitor C2 stores charge as a result of the generation of the stable output voltage (Vdig3V3) and makes that charge available in response to changing load conditions. As discussed above, a load 118 is coupled to the output node 112.

The circuit 100 generates a constant output voltage to the load by providing required load current. If the magnitude of the load current increases due transient conditions in the load, there will be a corresponding drop in the magnitude of the output voltage. This is sensed through the resistive divider circuit 114 and passed to the differential amplifier 102 through the feedback voltage VFB. The differential amplifier 102 functions as an error amplifier in comparing the feedback voltage VFB to the reference voltage VBG. There will be a corresponding increase in the voltage at the output node 108 of the differential amplifier 102 which results in an increase in the gate-to-source voltage of the power transistor MN5. The transistor MN5 will thus increase the magnitude of the current supplied to the load. This increase in current sourced to the load causes an increase in the voltage at the output node 112.

Figure 3A:
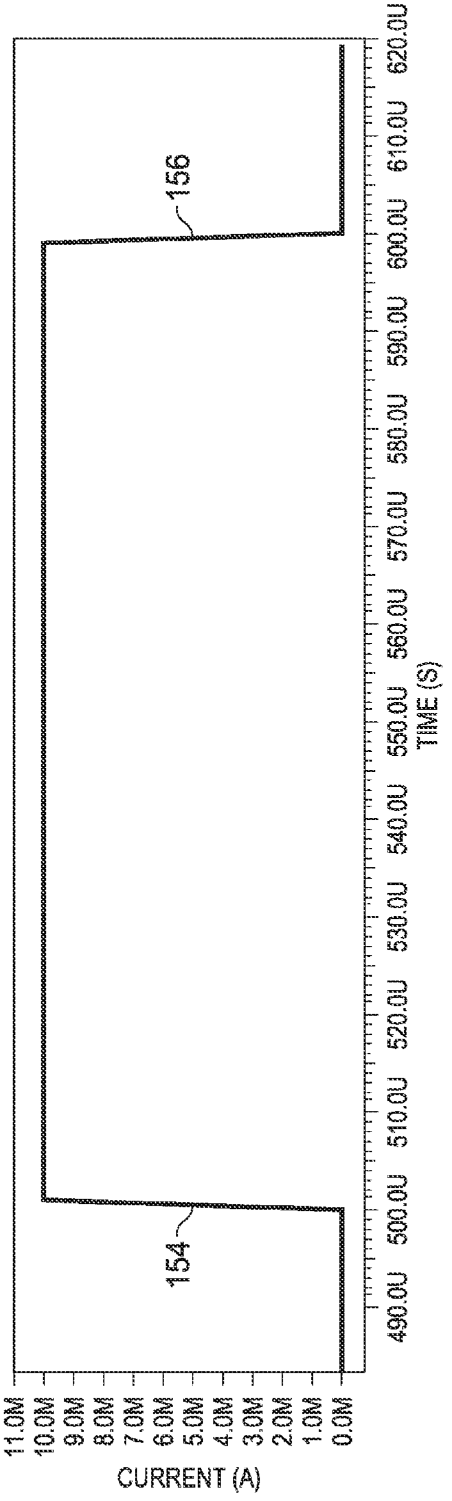
FIG. 3A is a graph of a load transient.

During steady state operation, the magnitude of the stable output voltage (Vdig3V3) at output node 112 is maintained at a predetermined value set by the reference voltage VBG and the resistive divider circuit 114. The output capacitor C2 is charged to the magnitude of the stable output voltage. If the current in the load changes abruptly (see, for example, reference 154 of FIG. 3A), the output capacitor C2 can supply current to load while the regulation loop catches up with the change in current demand by activating the power transistor MN5. However, capacitor C2 may not be able to supply the needed load current and the bandwidth limitation of the regulation loop may introduce a delayed current response. As a result, the output voltage drops (see, for example, dotted line at reference 160 in FIG. 3B).

The slew rate and bandwidth of the regulation loop are affected by the size of the tail current source I1 in the differential amplifier 102. For reasons of minimizing the quiescent current of the LDO circuit 100, it is preferred to maintain a relatively small size of the tail current source I1. This, however, adversely affects the transient performance of the circuit 100 as shown by the dotted line in FIG. 3.

Figure 2A:
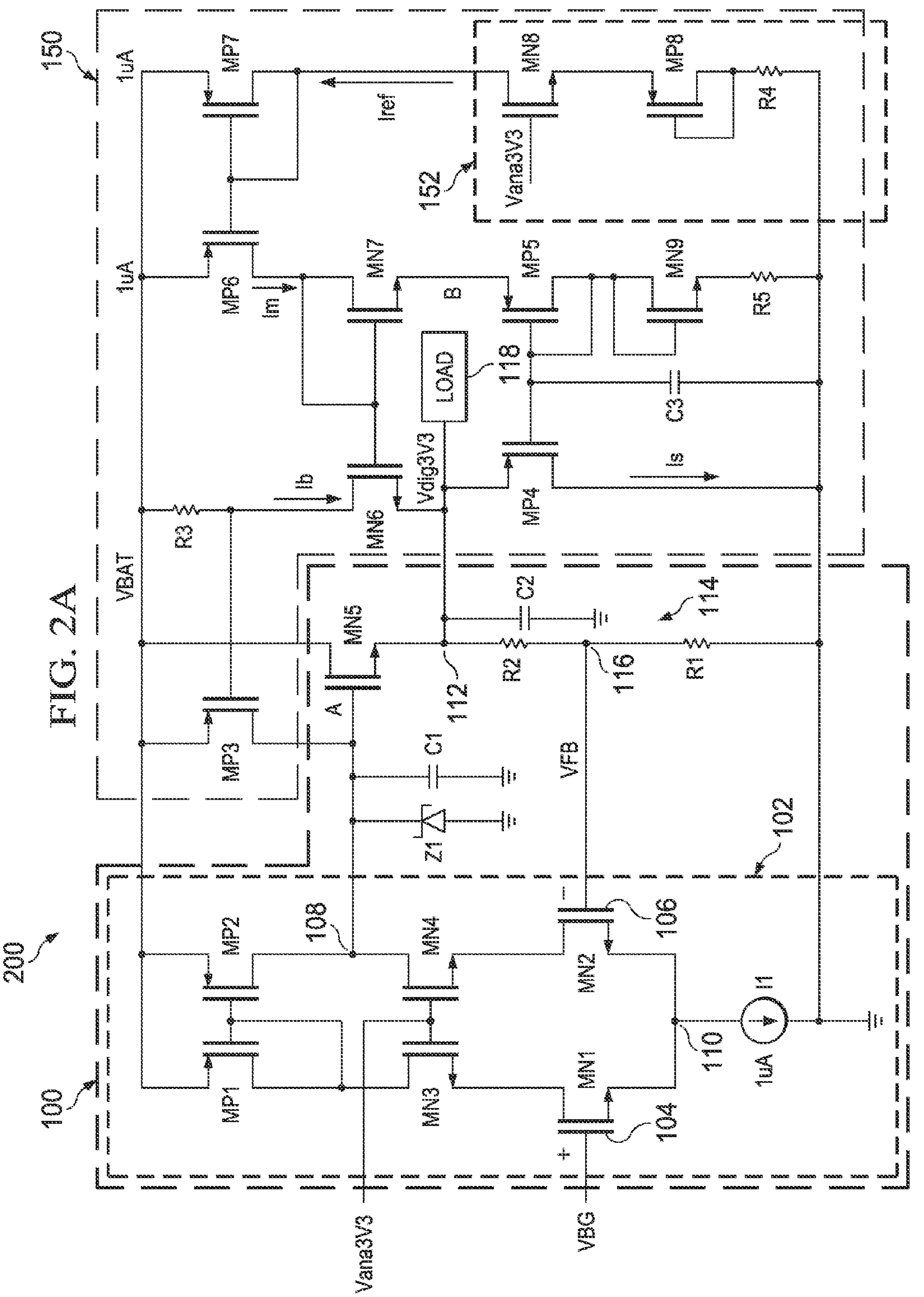
FIGS. 2A and 2B are circuit diagrams for embodiments of a low drop-out (LDO) voltage regulator circuit.

Reference is now made to FIG. 2A which is a circuit diagram of an embodiment of a low drop-out (LDO) voltage regulator circuit 200. Like references refer to like or similar components in FIG. 1. Discussion of such components is omitted. See above and the discussion of FIG. 1.

The circuit 200 includes the regulator circuit 100 and additional circuitry 150 configured to improve the load transient performance of the regulator circuit 100.

The circuitry 150 includes a transistor MP3 having a source-drain path coupled between the positive voltage supply node (VBAT) and the output node 108 of the differential amplifier 102 (which is the gate terminal node A of the power transistor MN5). The transistor MP3 is a p-channel MOSFET device. The gate terminal of transistor MP3 is biased by a resistor R3 coupled between the positive voltage supply node (VBAT) and the gate terminal itself. A transistor MN6 has its source-drain path coupled between the gate terminal of transistor MP3 and the output node 112 of the regulator circuit 100. The transistor MN6 is an n-channel MOSFET device.

The circuitry 150 further includes a transistor MP4 having a source-drain path coupled between the output node 112 of the regulator circuit 100 and the negative voltage supply node (ground). The transistor MP4 is a p-channel MOSFET device. The gate terminal of transistor MP4 is biased by a capacitor C3. The gate terminal of transistor MP4 is further coupled to the gate terminal of a transistor MP5, with the gate terminal of transistor MP5 coupled to the drain terminal of transistor MP5 in the form of a voltage copying circuit (with a current mirror configuration at the quiescent state). The transistor MP5 is also a p-channel MOSFET device. The transistors MP4 and MP5 are sized such that W/L of transistor MP5 is greater than the W/L of transistor MP4. Indeed, in a preferred embodiment, transistor MP5 is much larger than transistor MP4. For example, the size ratio of MP4 to MP5 may be 1:20.

The source-drain path of transistor MP5 is coupled in series with a transistor MN7. The transistor MN7 is an n-channel MOSFET device. The gate terminal of transistor MN7 is further coupled to the gate terminal of a transistor MN6 (described above), with the gate terminal of transistor MN7 coupled to the drain terminal of transistor MN7 in the form of a voltage copying circuit (with a current mirror configuration at the quiescent state). As an example, the transistors MN6 and MN7 are sized such that W/L of transistor MN7 is greater than the W/L of transistor MN6. Indeed, in a preferred embodiment, transistor MN7 is much larger than transistor MN6.

The source-drain path of transistor MP5 is coupled in series with a transistor MN9. The transistor MN9 is an n-channel MOSFET device. The gate of transistor MN9 is coupled to the drain of transistor MN9. Thus, transistor MN9 is connected to function as a diode. A resistor R5 is coupled between the source terminal of transistor MN9 and the negative voltage supply node (ground). The transistor MN9 and resistor R5 function in cooperation with capacitor C3 to form a biasing circuit for transistor MP4.

The source-drain path of transistor MN7 is coupled to the source-drain path of transistor MP6. The transistor MP6 is a p-channel MOSFET device. The source terminal of transistor MP6 is coupled to the positive voltage supply node (VBAT). The gate terminal of transistor MP6 is coupled to the gate terminal of transistor MP7. The transistor MP7 is also a p-channel MOSFET device whose source terminal is coupled to the positive voltage supply node (VBAT). Furthermore, the gate terminal of transistor MP7 is coupled to the drain terminal of transistor MP7. The transistors MP6 and MP7 accordingly form a current mirror circuit.

The source-drain path of transistor MP7 is coupled in series with the source-drain path of a cascode transistor MN8. The drain of transistor MP7 is coupled to the drain of transistor MN8. The gate of transistor MN8 is coupled to receive the bias voltage (Vana3V3). As discussed above, in a preferred embodiment, the bias voltage (Vana3V3) is a regulated voltage supplied to an analog portion of a device which includes the voltage regulator circuit 100, with the voltage regulator circuit 100 configured to generate a stable output voltage (Vdig3V3) supplied to a digital portion of the device (the load 118). Again, bias voltage (Vana3V3) may be provided from any suitable regulated voltage supply.

The source-drain path of transistor MN8 is coupled in series with a transistor MP8. The transistor MP8 is a p-channel MOSFET device. The gate of transistor MP8 is coupled to the drain of transistor MP8. Thus, transistor MP8 is connected to function as a diode. A resistor R4 is coupled between the drain terminal of transistor MP8 and the negative voltage supply node (ground).

The circuitry formed by resistor R4, transistor MP8 and transistor MN8 functions as a current source 152. For example, that current source 152 may be configured to generate a reference current Iref having an exemplary magnitude of 1 uA. The reference current Iref is mirrored by the current mirror formed by transistors MP6 and MP7 to output a mirror current Im. If the size of transistors MP6 and MP7 have a 1:1 relationship, the current Im=Iref (and would have the exemplary magnitude of 1 uA).

The configuration of MP4 and MP5 forms a voltage copying circuit operable in the quiescent state to copy the voltage at the output node 112 to node B (i.e., the voltage at node B is substantially equal to Vdig3V3). To achieve this effect, the size of transistors MN8 and MN9 should be the same and the transistors should be matched, the size of transistors MP5 and MP8 should be the same and the transistors should be matched, and the resistors R4 and R5 should be matched. Because of this voltage copying function (which makes the source voltages of transistors MN6 and MN7 equal), the transistors MN6 and MN7 operate as a current mirror. The mirror current Im is accordingly mirrored to output a bias current Ib in the source-drain path of transistor MN6. The W/L of transistor MN6 is much smaller than the W/L of transistor MN7, and thus the bias current Ib is a fraction of the mirror current Im. The bias current Ib flows through the resistor R3 to generate a voltage biasing the gate terminal of transistor MP3. By proper selection of the resistance value of R3 and the size ratio of transistors MN6 and MN7, the transistor MP3 can be biased in the quiescent operating state at a point just short of turn on (i.e., just below the threshold turn on voltage). Thus, in the quiescent state, the transistor MP3 is off.

Figure 3B:
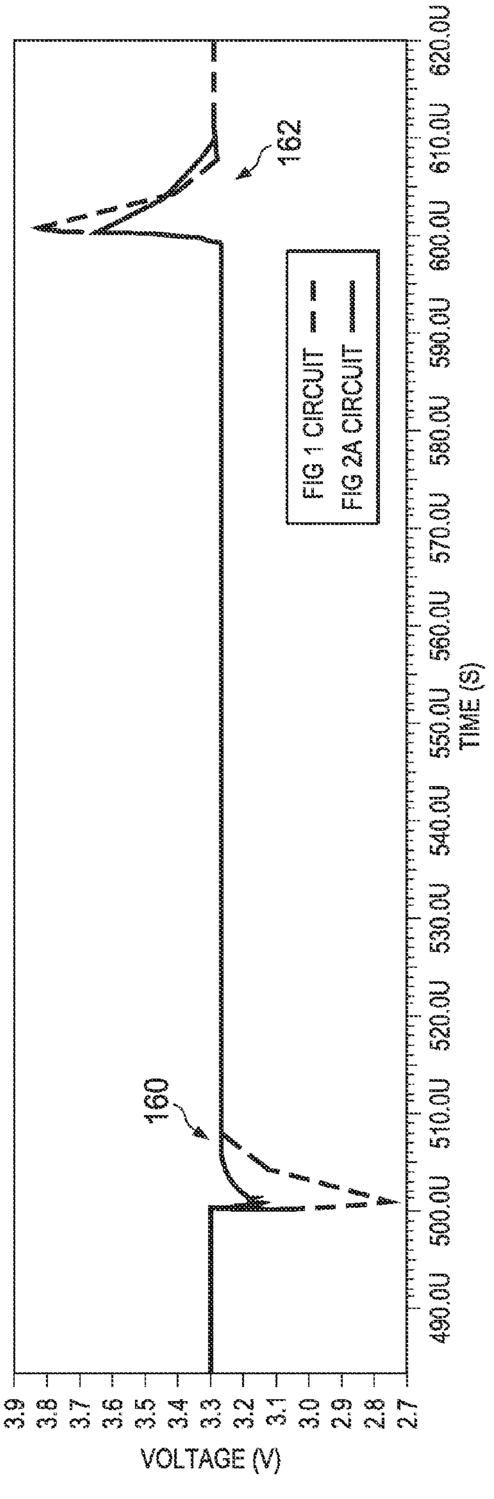
FIG. 3B is a graph comparing the load transient performance of the circuits shown in FIGS. 1 and 2A.

In response to a transient condition at the output node 112, the voltage Vdig3V3 may drop. This drop in the voltage Vdig3V3 increases the gate-to-source voltage of transistor MN6 causing an increase in the bias current Ib flowing in resistor R3. This increase in the bias current Ib is sufficient to increase the gate-to-source voltage of transistor above the threshold voltage of transistor MP3. The transistor MP3, which was fully off in the DC condition, accordingly turns on to source additional recovery current to the gate terminal (node A) of the power transistor MN5 and increase its gate-to-source voltage. Additional current is accordingly supplied to the load through the output node 112. This feedback response is quicker than, and in addition to, the response provided through the regulation loop (i.e., through the amplifier 102). The left side of FIG. 3B shows (reference 160), with the solid line, an improvement in load transient response (reference 154 of FIG. 3A) due to the turn on of transistor MP3.

The configuration of MN6 and MN7 forms a voltage copying circuit operable in the quiescent state to copy the voltage at the output node 112 to node B (i.e., the voltage at node B is substantially equal to Vdig3V3). Because of this voltage copying function (which makes the source voltages of transistors MP4 and MP5 equal), the transistors MP4 and MP5 operate as a current mirror. The current Is in transistor MP4 at the DC condition is very small (for example, about 50 nA). The mirror current Im is accordingly mirrored to output a sink current Is in the source-drain path of transistor MP4. The W/L of transistor MP4 is much smaller than the W/L of transistor MP5, and thus the sink current Is has a first non-zero magnitude that is a fraction of the mirror current Im (and the current Is may, in a preferred implementation, be equal to the current Ib).

The mirror current Im further flows through the circuitry of MN9 and R5. This charges capacitor C3 to a voltage equal to the voltage drop across transistor MN9 and resistor R3 in response to the flow of mirror current Im. The voltage across capacitor C3 fixes the voltage at the gate of transistor MP4 so that it does not vary in response to transient conditions at the output node 112.

In response to a transient condition at the output node 112, the voltage Vdig3V3 may increase. This increase in the voltage Vdig3V3 causes a corresponding increase in the gate-to-source voltage of transistor MP4 (it being remembered that the gate voltage of transistor MP4 is fixed by the voltage across capacitor C3 which functions to stabilize the voltage at the gate of transistor MP4). The increased gate-to-source voltage causes transistor MP4 to turn on harder and sink additional recovery current from the output node 112 to reduce the voltage Vdig3V3 (i.e., the current Is transitions to a second non-zero magnitude greater than the first non-zero magnitude). This feedback response is quicker than, and in addition to, the response provided through the regulation loop (i.e., through the amplifier 102). The right side of FIG. 3B shows (reference 162), with the solid line, an improvement in load transient (reference 156 of FIG. 3A) response due to the harder turn on of transistor MP4.

Figure 2B:
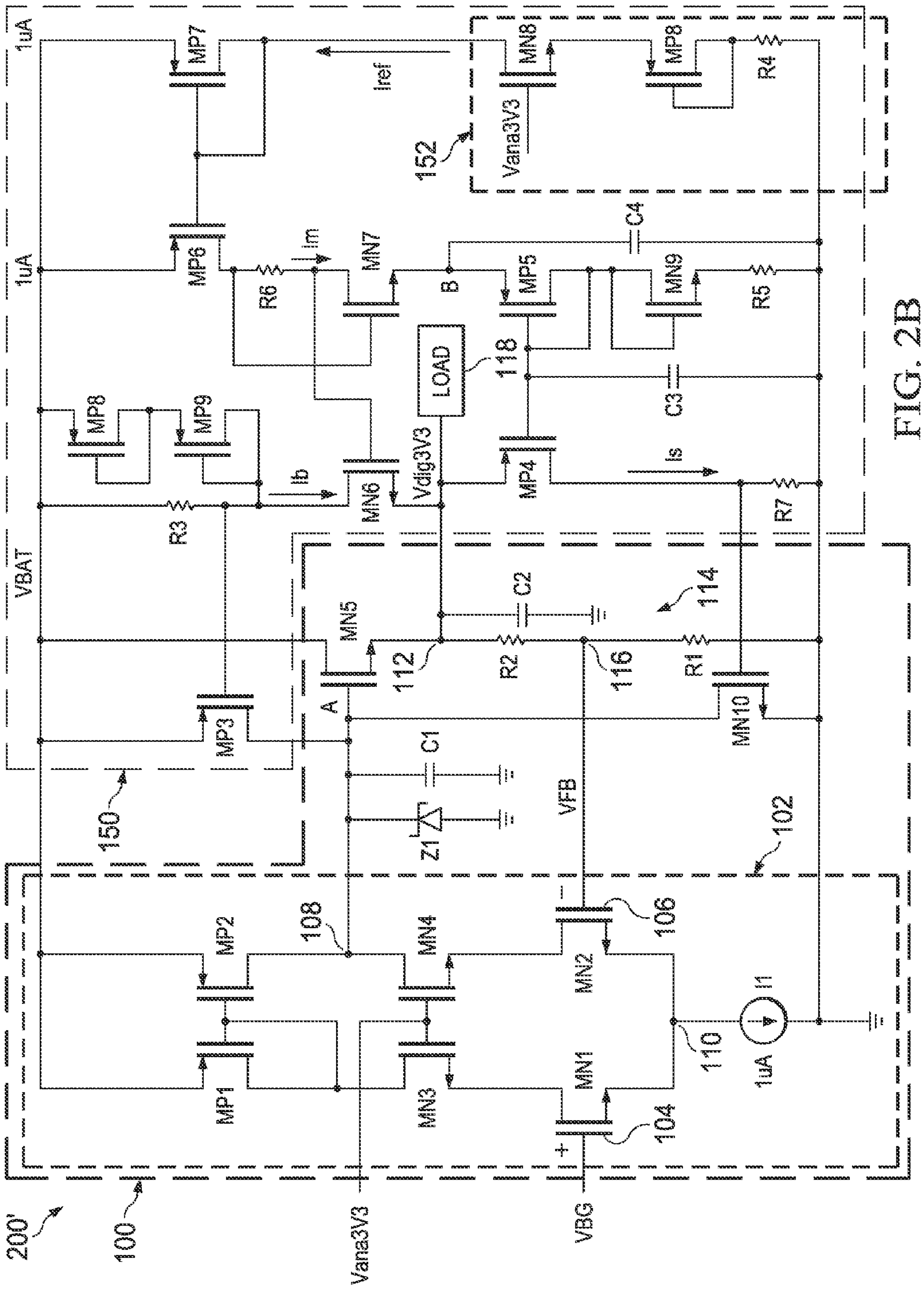

Reference is now made to FIG. 2B which is a circuit diagram of an embodiment of a low drop-out (LDO) voltage regulator circuit 200'. Like references refer to like or similar components in FIG. 2A. Discussion of such components is omitted. See above and the discussion of FIG. 2A.

In FIG. 2B, the current Is develops a voltage across a resistor R7 coupled in series with the source-drain path of transistor MP4. That voltage is applied to the gate terminal of a transistor MN10. Transistor MN10 is an n-channel MOSFET having a source-drain path coupled between the node 108 (at the gate terminal of transistor MN5) and the ground reference node. In the quiescent state, the current Is is small and the voltage across resistor R7 is not sufficient to turn on transistor MN10.

Figure 3C:
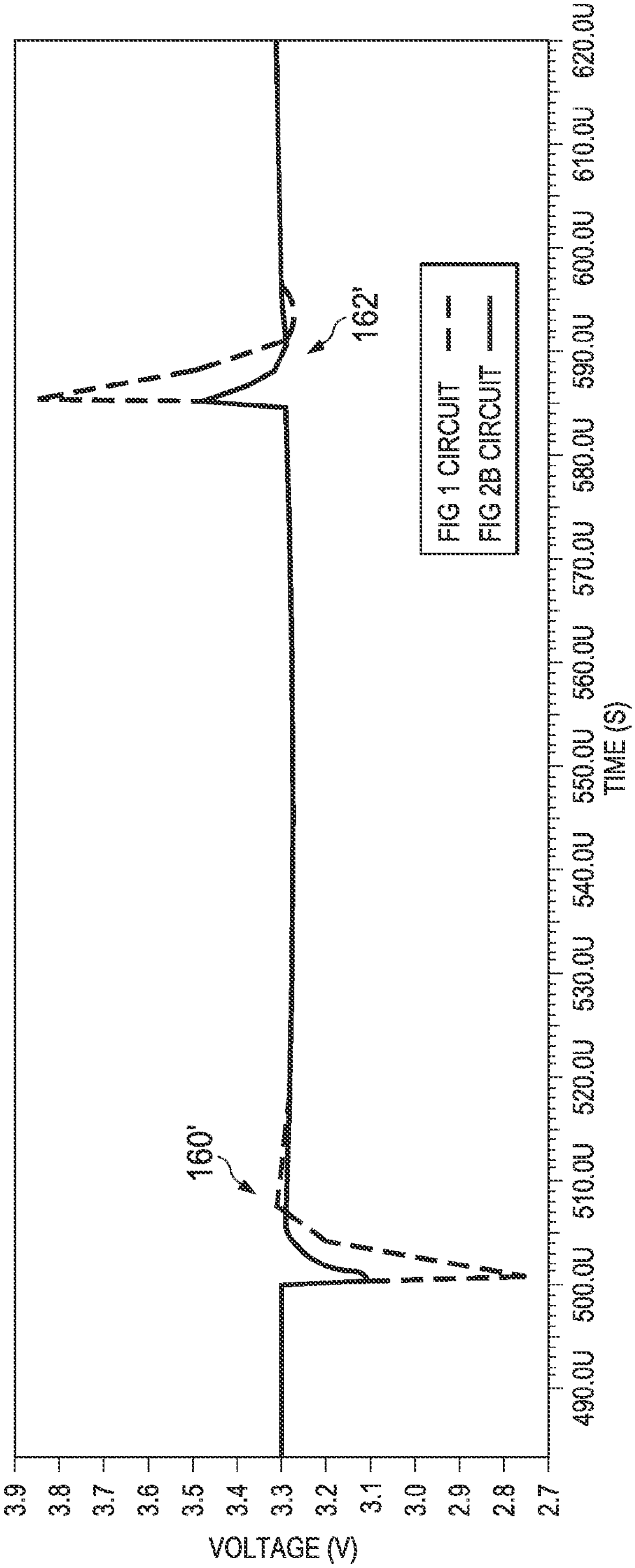
FIG. 3C is a graph comparing the load transient performance of the circuits shown in FIGS. 1 and 2B.

In response to a transient condition at the output node 112, the voltage Vdig3V3 may rise. This rise in the voltage Vdig3V3 increases the gate-to-source voltage of transistor MP4 causing an increase in the current Is flowing in resistor R7. This increase in the current Is is sufficient to increase the gate-to-source voltage of transistor MN10 above the threshold voltage of transistor MN10. The transistor MN10, which was fully off in the DC condition because of the low current Is, accordingly turns on to sink additional recovery current from the gate terminal (node A) of the power transistor MN5 and decrease its gate-to-source voltage. Less current is accordingly supplied to the load through the output node 112. This feedback response is quicker than, and in addition to, the response provided through the regulation loop (i.e., through the amplifier 102). The right side of FIG. 3C shows (reference 162'), with the solid line, an improvement in load transient response (reference 154 of FIG. 3A) due to the turn on of transistor MN10.

In FIG. 2B, a pair of diode-connected transistors MP8 and MP9 are coupled in series with each other and in parallel with the resistor R3. This circuit protects the gate-to-source voltage of transistor MP3 to a value smaller than 3.3V in the transient condition. Although not shown in FIG. 2A, it will be understood that this circuitry could also be provided in the circuit 200.

In FIG. 2B, a capacitor C4 is coupled between the node B and the ground reference node. The capacitor C4 functions to stabilize the voltage at node B in case noise might affect the node B voltage. Although not shown in FIG. 2A, it will be understood that this circuitry could also be provided in the circuit 200.

In FIG. 2B, a resistor R6 is coupled in series between the series connected source-drain paths of transistors MP6 and MN7. The drain terminal of transistor MP6 is coupled to the gate terminal of transistor MN7. The drain terminal of transistor MN7 is coupled to the gate terminal of transistor MN6. Transistors MN6 and MN7 are of a same size and are matched. With this configuration, the DC voltage at node B is set to substantially equal the voltage Vdig3V3 at node 112. The current Im flows through resistor R6 which functions to control the gate-to-source voltage of transistor MN6 to a value less than its threshold voltage in the quiescent state. In the transient state, the current Im increase and the gate-to-source voltage of transistor MN6 rises sufficiently to increase the current flowing in transistor MN6. This increased current flow passing through resistor R3 causes transistor MP3 to turn on as described above (see, the left side of FIG. 3C and reference 160'). The circuit using resistor R6 provides enhanced performance over the current mirror connection of MN6 and MN7 in FIG. 2A because the resistor permits a more accurate setting of the voltage conditions governing the turn on of transistor MN6. Although not shown in FIG. 2A, it will be understood that this circuitry could alternatively be used in the circuit 200.

In the disclosure herein, operations of circuit embodiment(s) may be described with reference to method embodiment(s) for illustrative purposes. However, it should be appreciated that the operations of the circuits and the implementations of the methods in the disclosure may be independent of one another. That is, the disclosed circuit embodiments may operate according to other methods and the disclosed method embodiments may be implemented through other circuits.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacturing, compositions of matter, means, methods, or steps.

What is claimed is:

1. A circuit, comprising:

a voltage regulator circuit with a feedback regulation loop and a drive transistor configured to supply an output current to a regulated output node; and a transient recovery circuit, comprising:

a first transistor configured to source a first current to a control terminal of the drive transistor, wherein said first current is supplied in addition to a regulation control current applied to the control terminal of the drive transistor in response to operation of the feedback regulation loop;

a first control circuit configured to selectively actuate the first transistor in response to a drop in voltage at the regulated output node;

a second transistor configured to sink a second current from the regulated output node; and a second control circuit configured to bias the second transistor to apply the second current at a first non-zero magnitude when the voltage regulator circuit is operating in a quiescent mode, sense an increase in voltage at the regulated output node and to control operation of said second transistor to increase a magnitude of the second current, from the first non-zero magnitude to a second, greater, non-zero magnitude, in response to the sensed increase in voltage at the regulated output node;

wherein the second control circuit comprises:

a voltage copying circuit configured to copy a voltage at the regulated output node to an intermediate node in the quiescent mode;

a current mirror circuit including the second transistor, said current mirror circuit coupled to the regulated output node and to the intermediate node, said current mirror configured to receive an input current and output the second current; and a capacitor coupled to a common control terminal of the current mirror circuit and configured to apply a fixed bias voltage to a control terminal of the second transistor.

2. The circuit of claim 1, wherein said first control circuit is configured to bias the first transistor in an off state when the voltage regulator circuit is operating in the quiescent mode, said first control circuit further configured to sense the drop in voltage at the regulated output node and respond by biasing the first transistor into an on state.

3. The circuit of claim 2, wherein the first control circuit comprises:

a voltage copying circuit configured to copy a voltage at the regulated output node to an intermediate node in the quiescent mode;

a current mirror circuit coupled to the regulated output node and to the intermediate node, said current mirror configured to receive an input current and output a bias current; and a resistor configured to receive the bias current and generate a bias voltage applied to a control terminal of the first transistor.

4. The circuit of claim 3, wherein the bias current is a fraction of the input current.

5. The circuit of claim 3, wherein the bias current has a magnitude sufficient to cause the resistor to generate the bias voltage in the quiescent mode which is less than a threshold turn on voltage of the first transistor.

6. The circuit of claim 5, wherein the current mirror circuit is configured to respond to the drop in voltage at the regulated output node and increase the bias current to a magnitude sufficient to cause the resistor to generate the bias voltage which exceeds the threshold turn on voltage of the first transistor.

7. The circuit of claim 3, wherein the input current is supplied from a regulated reference current.

8. The circuit of claim 1, wherein the second current is a fraction of the input current.

9. The circuit of claim 1, wherein the current mirror circuit is configured to respond to the increase in voltage at the regulated output node by increasing the magnitude of the second current.

10. The circuit of claim 1, wherein said transient recovery circuit further comprises:

a third transistor configured to sink a third current from the control terminal of the drive transistor, wherein said third current is in addition to the regulation control current applied to the control terminal of the drive transistor in response to operation of the feedback regulation loop; and a third control circuit configured to selectively actuate the third transistor in response to the increase in voltage at the regulated output node.

11. The circuit of claim 10, wherein the third control circuit is configured to convert the second current to a control signal applied to a control terminal of the third transistor.

12. The circuit of claim 11, wherein the second current at the first magnitude is insufficient to actuate the third transistor and wherein the second current at the second magnitude is sufficient to actuate the third transistor.

13. A circuit, comprising:

a voltage regulator circuit with a feedback regulation loop and a drive transistor configured to supply an output current to a regulated output node; and a transient recovery circuit comprising a transistor configured to be selectively actuated in response to a change in voltage at the regulated output node, said selectively actuated transistor configured to apply current to a control terminal of the drive transistor, said applied current being in addition to current applied to the control terminal of the drive transistor in response to operation of the feedback regulation loop;

a biasing circuit configured to bias the selectively actuated transistor, said biasing circuit comprising:

a voltage copying circuit configured to copy a voltage at the regulated output node to an intermediate node;

a current mirror circuit coupled to the regulated output node and to the intermediate node, said current mirror configured to receive an input current and output a bias current; and a resistor configured to receive the bias current and generate a bias voltage applied to a control terminal of the selectively actuated transistor.

14. The circuit of claim 13, wherein the biasing circuit is configured to bias the selectively actuated transistor in an off state when the voltage regulator circuit is operating in a quiescent mode, and is configured to sense the change in voltage at the regulated output node and respond by biasing the selectively actuated transistor into an on state.

15. The circuit of claim 13, wherein the current mirror circuit is configured to respond to the change in voltage at the regulated output node by increasing the bias current to a magnitude sufficient to cause the resistor to generate a bias voltage which exceeds a threshold turn on voltage of the selectively actuated transistor.

16. A circuit, comprising:

a voltage regulator circuit with a feedback regulation loop and a drive transistor configured to supply an output current to a regulated output node;

a transient recovery circuit comprising: an additional transistor coupled to apply current to the regulated output node, said transistor configured to increase a magnitude of the applied current, from a first non-zero magnitude to a second, greater, non-zero magnitude, in response to a change in voltage at the regulated output node; and a biasing circuit configured to bias the additional transistor to supply the applied current at the first non-zero magnitude when the voltage regulator circuit is operating in a quiescent mode, said biasing circuit configured to sense the change in voltage at the regulated output node and respond by increasing the magnitude of said applied current to the second non-zero magnitude;

wherein the biasing circuit comprises:

a voltage copying circuit configured to copy a voltage at the regulated output node to an intermediate node in the quiescent mode;

a current mirror circuit including the additional transistor, said current mirror circuit coupled to the regulated output node and to the intermediate node, said current mirror configured to receive an input current and output the applied current; and a capacitor coupled to a common control terminal of the current mirror circuit and configured to apply a fixed bias voltage to a control terminal of the additional transistor.

17. The circuit of claim 16, wherein the current mirror circuit is configured to respond to the change in voltage at the regulated output node by increasing the magnitude of the applied current to the second non-zero magnitude.

18. A circuit, comprising:

a voltage regulator circuit with a feedback regulation loop and a drive transistor configured to supply an output current to a regulated output node; and a transient recovery circuit, comprising:

a first transistor configured to source a first current to a control terminal of the drive transistor, wherein said first current is supplied in addition to a regulation control current applied to the control terminal of the drive transistor in response to operation of the feedback regulation loop; and a first control circuit configured to bias the first transistor in an off state when the voltage regulator circuit is operating in a quiescent mode, said first control circuit further configured to sense a change in voltage at the regulated output node and respond by biasing the first transistor into an on state;

wherein the first control circuit comprises:

a voltage copying circuit configured to copy a voltage at the regulated output node to an intermediate node in the quiescent mode;

a current mirror circuit coupled to the regulated output node and to the intermediate node, said current mirror configured to receive an input current and output a bias current; and a resistor configured to receive the bias current and generate a bias voltage applied to a control terminal of the first transistor.

19. The circuit of claim 18, wherein the bias current is a fraction of the input current.

20. The circuit of claim 18, wherein the bias current has a magnitude sufficient to cause the resistor to generate the bias voltage in the quiescent mode which is less than a threshold turn on voltage of the first transistor.

21. The circuit of claim 20, wherein the current mirror circuit is configured to respond to the drop in voltage at the regulated output node and increase the bias current to a magnitude sufficient to cause the resistor to generate the bias voltage which exceeds the threshold turn on voltage of the first transistor.

22. The circuit of claim 18, wherein the input current is supplied from a regulated reference current.

* * * * *